United States Patent [19]
Routens

[11] 4,180,345
[45] Dec. 25, 1979

[54] SADDLE SUPPORT FOR BICYCLES AND THE LIKE

[76] Inventor: Jean-Paul Routens, 8, Cours Berriat, Grenoble (Isère), France

[21] Appl. No.: 917,160

[22] Filed: Jun. 20, 1978

[51] Int. Cl.² .............................................. F16C 11/00
[52] U.S. Cl. ..................................... 403/84; 297/195; 403/121
[58] Field of Search ...................... 403/4, 84, 87, 121; 297/195, 203

[56] References Cited

U.S. PATENT DOCUMENTS

| | | | |
|---|---|---|---|
| 540,118 | 5/1895 | Stearns | 297/195 X |
| 2,933,391 | 4/1960 | Shook | 403/4 X |
| 3,891,333 | 6/1975 | Jean | 297/295 X |
| 3,992,054 | 11/1976 | Campagnolo | 297/195 |

FOREIGN PATENT DOCUMENTS

| | | |
|---|---|---|
| 831578 | 6/1938 | France . |
| 2233216 | 1/1975 | France ................................... 297/195 |
| 2303700 | 10/1976 | France . |
| 532658 | 8/1955 | Italy ......................................... 297/195 |

Primary Examiner—Andrew V. Kundrat
Attorney, Agent, or Firm—Karl F. Ross

[57] ABSTRACT

A saddle support for bicycles or the like. The support comprises a saddle stem terminating in a head portion, and a cradle adapted to be located below the head of the saddle stem. The head of the saddle stem is provided with projections having arcuate grooves and the longitudinal members of the saddle frame are intended to be introduced and clamped in such grooves and also in corresponding recesses in the cradle. The cradle is adapted to be fixed below the head of the saddle stem by fore and aft screws which may be used to adjust the saddle.

6 Claims, 7 Drawing Figures

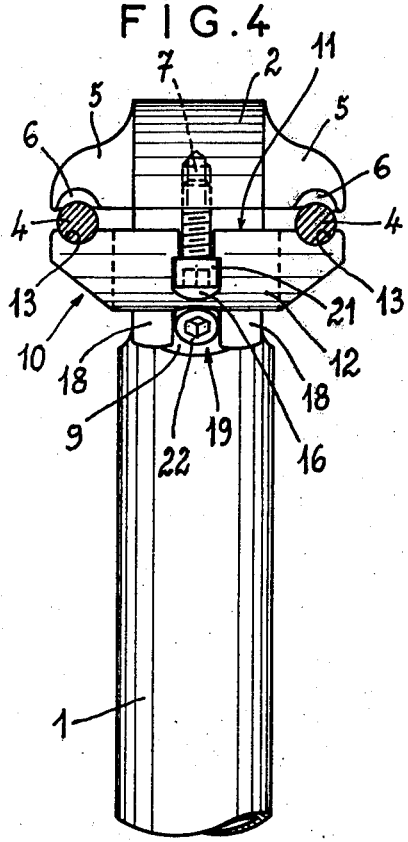
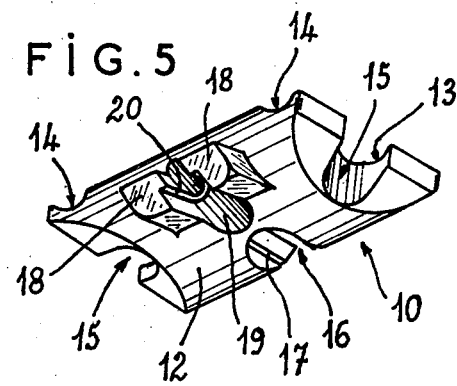
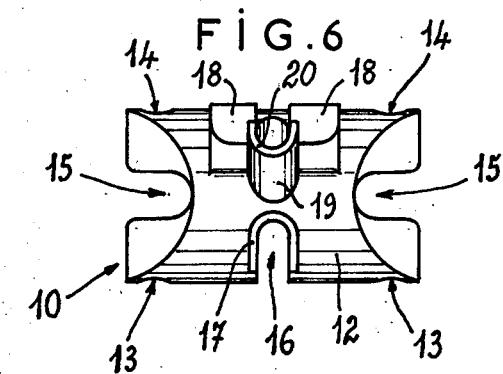
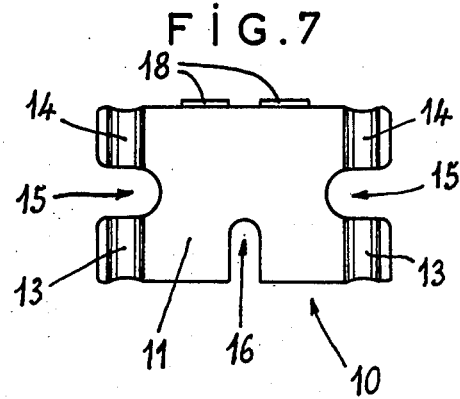

SADDLE SUPPORT FOR BICYCLES AND THE LIKE

FIELD OF THE INVENTION

The present invention relates to a saddle support for bicycles and the like, of the type constituted by a saddle stem terminating in a head comprising means for adjusting the longitudinal position and the inclination of the saddle frame.

BACKGROUND OF THE INVENTION

It will be recalled that the "saddle stem" is the tubular member whose lower part is inserted in the saddle tube of the frame, with the possibility of vertical adjustment, whereas the "saddle frame" is the metal frame, composed essentially of two substantially parallel longitudinal members, by means of which the saddle proper is fixed.

Various saddle supports of this type, facilitating an adjustment of the longitudinal position and inclination, as well as locking in the chosen position, are known. Certain of these supports comprise a single member or two side plates mounted to pivot about a transverse shaft on the saddle stem. The part or side plates in question serve as guides for the sliding movement of the saddle frame and thus simultaneously ensure adjustment of the inclination and longitudinal position, the locking of the saddle frame being ensured by means comprising screws. Another well-known saddle support comprises two cross bars which both bear on the two longitudinal members of the saddle frame. These two cross bars are connected to the head of the saddle stem by means of screws, which make it possible to adjust the distance of each cross bar from the head of the saddle stem in order to adjust the inclination of the saddle, the tightening of these screws thus ensuring locking of the saddle in the desired longitudinal position. Finally, it is also possible to mention a further saddle support, in which the head of the saddle stem has a concave upper side, on which rests a cradle having an adjustable inclination, with two channels receiving the longitudinal members of the saddle frame. A small plate, pressed against these longitudinal members by the tightening of a screw passing through the aforesaid cradle, ensures the immobilization of the saddle in the desired longitudinal position as well as the locking of the cradle in the desired inclination.

All these devices, including the last-mentioned, which comprises only one adjusting and locking screw, are very complicated mechanically, in the sense that they comprise numerous moving parts and their adjusting and locking means are frequently only accessible with difficulty.

OBJECT OF THE INVENTION

The present invention intends to remedy these drawbacks by providing a saddle support of very simplified construction, in which the adjustment of the longitudinal position and the inclination of the saddle frame, as well as locking of the latter in the chosen position, are effected by means which are easily accessible.

SUMMARY OF THE INVENTION

To this end, in the saddle support according to the invention, on each of its two side faces, the head of the saddle stem comprises a projection having a groove whose base, directed downwards, has a substantially annular shape. A cradle is fixed under the head of the saddle stem by means of two screws located one in front of the other and comprises on each side, two recesses having coaxial cylindrical bases which are directed upwards, each of the two longitudinal members of the saddle frame being introduced and clamped in a groove in the head of the saddle stem and in the two corresponding recesses of the cradle, located on either side of the groove.

This saddle support thus comprises a single moving part, namely the cradle, associated with two screws which make it possible to adjust the inclination of this cradle in order to fix the inclination of the saddle, the annular shape of the base of the grooves enabling the longitudinal members to bear against the same fixed member whatever the inclination of the saddle. Furthermore, since the cradle is located under the head of the saddle stem, access to the two screws which make it possible to adjust its inclination and thus to immobilize the saddle frame longitudinally, presents no difficulties.

BRIEF DESCRIPTION OF THE DRAWINGS

However, the invention will be better understood by means of the ensuing description, referring to the accompanying diagrammatic drawing illustrating, as a non-limiting example, one embodiment of this saddle support.

In the drawing:

FIG. 4 is a view through the rear of the saddle support, the longitudinal members of the saddle support being shown in section;

FIG. 5 is a perspective view showing solely the cradle; and

FIGS. 6 and 7 are plan views of the cradle, respectively from below and from above.

SPECIFIC DESCRIPTION

Figure 1:
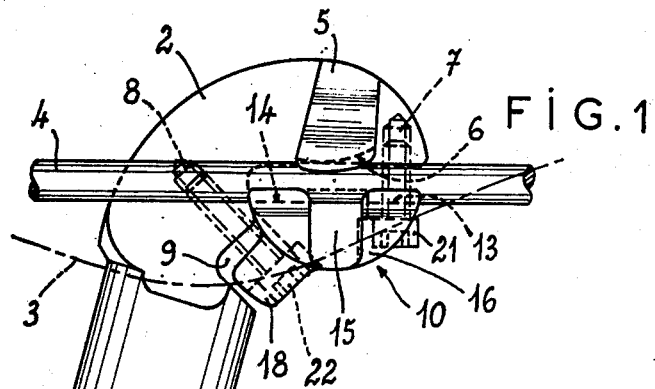
FIG. 1 is a general side view of a saddle support according to the invention.

The saddle support illustrated in FIG. 1 comprises essentially a saddle stem 1, shown partly, whose lower part is intended to be inserted in the saddle tube of a bicycle frame and whose upper part forms a head 2 serving for securing the saddle 3, whose outline has been shown only partly, in dot-dash lines. This saddle 3 is mounted in a conventional manner on a frame known as the saddle frame, composed essentially of two substantially parallel longitudinal members 4, passing on either side of the head 2.

The invention relates more particularly to the means which make it possible to adjust the longitudinal position of the longitudinal members 4 as well as their inclination with respect to the head 2 and to lock these longitudinal members on said head in the chosen position.

The head 2, which extends towards the rear of the saddle stem 1, comprises two flat and parallel side faces, from which project two symmetrical parts 5. A groove 6 is formed in the lower part of each of these lateral projections 5. The base of this groove 6, directed downwards, has an annular shape, i.e. comprises a double curvature both in the longitudinal and transverse directions, as shown in FIGS. 1 and 4.

The lower part of the head 2 comprises two tapped holes 7 and 8, whose axes are located in the plane of symmetry of said head. The first tapped hole 7, having a substantially vertical axis, is formed at the rear of the two projections 5. The second tapped hole 8, located in front of these two projections 5, is formed along an inclined axis and opens into a type of notch 9 of V-shaped profile, cut at the junction of the saddle stem 1 and 2.

Fixed below the head 2 is a cradle 10, a part whose structure is shown clearly in FIGS. 5 to 7, which show the latter separately. The upper side 11 of the cradle 10 is substantially flat, whereas its lower side 12 is substantially cylindrical.

Provided on each side of the cradle 10 are two recesses 13 and 14, cut in the upper side 11 and separated by a lateral notch 15. The two recesses 13 and 14 have coaxial cylindrical bases, as shown more particularly in FIG. 7, the axes of the recesses on the right-hand side and left-hand side also being parallel.

The cradle 10 comprises another notch 16 provided in the centre of its rear part, this notch comprising an enlarged lower part and a narrower upper part connected by a flat surface 17 parallel to the flat upper side 11 and shown in particular in FIG. 6.

Formed in the front part of the cradle 10 are two symmetrical lugs 18, which project from its lower cylindrical side 12. These two lugs define a notch 19 therebetween, which notch, like the former, comprises an enlarged lower part and a narrower upper part connected by a flat surface 20.

Figure 2:
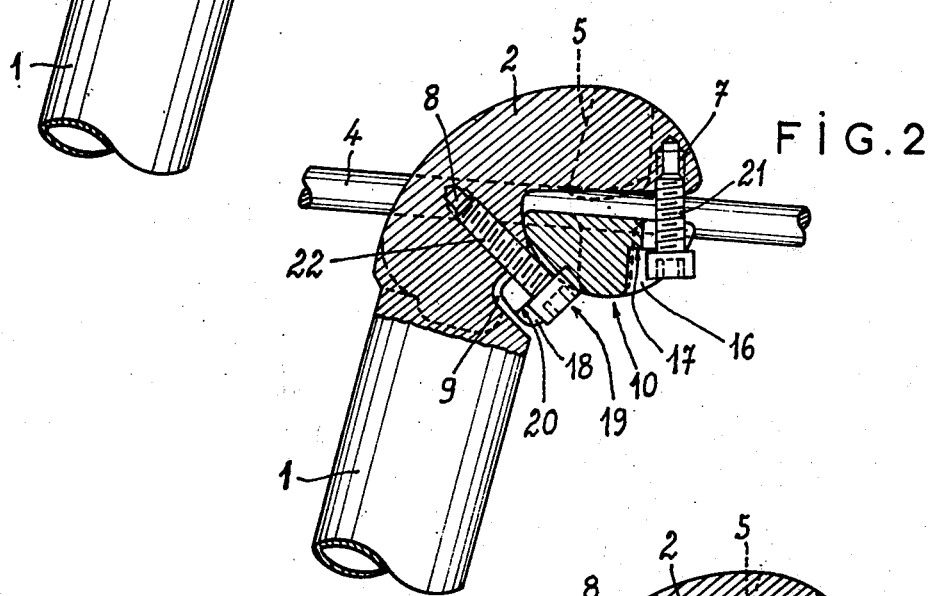
FIGS. 2 and 3 are longitudinal sectional views, passing through the axes of the two screws, showing the position of the same parts for two different inclinations of the saddle.

The cradle 10 is connected to the head 2 by means of two screws 21 and 22. The screw 21, located at the rear, is introduced through the notch 16 in the cradle 10 and inserted in the tapped hole 7. Its hollow hexagonal head fits in the enlarged part of the notch 16 and bears on the surface 17, as shown in FIG. 2. The screw 22, located at the front, is introduced in the same manner through the notch 19 in the cradle 10 and inserted in the tapped hole 8. Its hollow hexagonal head fits in the enlarged part of the notch 19 and bears on the surface 20. It should be noted that when the cradle 10 is in position, the two lugs 18 are housed in the notch 9.

Each of the longitudinal members 4 of the saddle frame is introduced both into the groove 6 in the projection 5 located on the corresponding side and in the two recesses 13 and 14 of the cradle 10 located on the same side, on either side of this groove 6. Tightening of the two screws 21 and 22 tends to move the cradle 10 closer to the head 2, thus to tighten the longitudinal members 4 against the cylindrical base of the two recesses 13 and 14 and against a point of the annular base of the groove 6. Locking of the saddle frame is thus achieved between jaws.

Naturally, when the screws 21 and 22 are loosened, the longitudinal members 4 may slide freely between the cradle 10 and the head 2, which facilitates adjustment of the longitudinal position of the saddle 3.

In addition, the two screws 21 and 22 make it possible to adjust the inclination of the saddle. It will easily be understood that this inclination is fixed by the cradle 10, since the longitudinal members 4 are immobilized in a position parallel to the axes of the cylindrical recesses 13 and 14. When one wishes to change the inclination of the saddle, it is thus necessary to loosen the front or rear screw, depending on whether one wishes to tilt the saddle downwards or upwards, then to pivot the cradle 10 and tighten the other screw.

Figure 3:
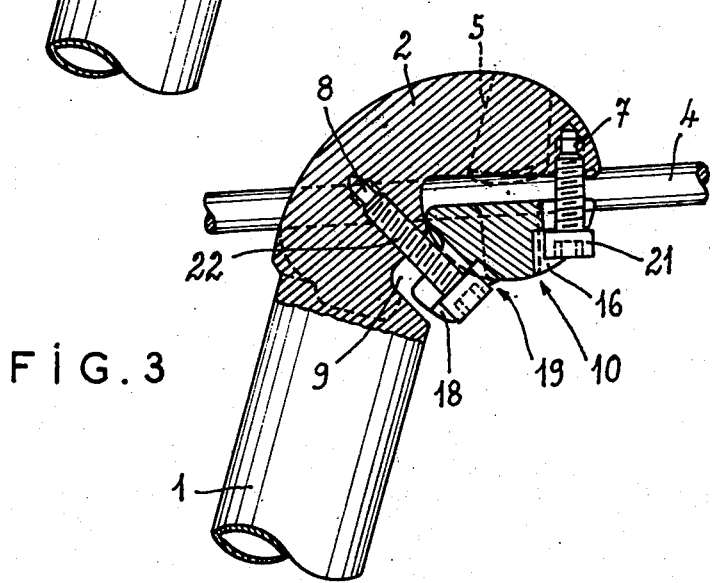

In order to provide a better illustration of the use of this adjustment device, FIGS. 2 and 3 show the saddle support in question with two different inclinations. In the case of FIG. 2, where the front of the saddle is raised, the rear screw 21 is relatively slack and the front screw 22 is relatively tight. Conversely, in the case of FIG. 3, where the front of the saddle is lowered, the rear screw 21 is relatively tight and the front screw 22 is relatively slack. It should be noted that, depending on the inclination of the saddle, the longitudinal members are applied at various points of the grooves 6 having an annular base.

Naturally, the proposed device facilitates a continuous adjustment of the inclination of the saddle, which may assume all intermediate values. Finally, this device also allows easy removal of the saddle. In fact, it is sufficient to completely unscrew the screws 21 and 22 in order to separate the cradle 10 from the head 2 and thus to completely release the saddle frame.

Naturally, the invention is not limited to the single embodiment of this saddle support which has been described above by way of example. On the contrary, it includes all variations comprising equivalent means.

What is claimed is:

1. A saddle support for bicycles and the like, of the type constituted by a saddle stem terminating in a head comprising means for adjusting the longitudinal position and the inclination of a saddle frame to be supported by the head, wherein the head of the saddle stem comprises, on each of two side faces, a projection formed with a groove whose base, directed downwards, has a substantially arcuate shape, and a cradle adapted to be fixed below the head of the saddle stem by means of two screws located one in front of the other and both ahead of said stem, said cradle having on each side, two recesses having upwardly directed coaxial cylindrical bases, each of two longitudinal members of the saddle frame being intended to be introduced and clamped in a groove in the head of the saddle stem and in the two corresponding recesses of the cradle, located on either side of the groove.

2. A saddle support for bicycles and the like, of the type constituted by a saddle stem terminating in a head comprising means for adjusting the longitudinal position and the inclination of a saddle frame to be supported by the head, wherein the head of the saddle stem comprises, on each of two side faces, a projection formed with a groove whose base, directed downwards, has a substantially arcuate shape, and a cradle adapted to be fixed below the head of the saddle stem by means of two screws located one in front of the other, said cradle having on each side, two recesses having upwardly directed coaxial cylindrical bases, each of two longitudinal members of the saddle frame being intended to be introduced and clamped in a groove in the head of the saddle stem and in the two corresponding recesses of the cradle, located on either side of the groove, the head of the saddle stem comprising, in order to receive the two screws, a first tapped hole having a substantially vertical axis formed at the rear of the two projections comprising grooves having an annular base and a second tapped hole having an inclined axis, located in front of these two projections.

3. A saddle support for bicycles and the like, of the type constituted by a saddle stem terminating in a head comprising means for adjusting the longitudinal position and the inclination of a saddle frame to be supported by the head, wherein the head of the saddle stem comprises, on each of two side faces, a projection formed with a groove whose base, directed downwards, has a substantially arcuate shape, and a cradle adapted to be fixed below the head of the saddle stem by means of two screws located one in front of the other, said cradle having on each side, two recesses having upwardly directed coaxial cylindrical bases, each of two longitudinal members of the saddle frame being intended to be introduced and clamped in a groove in the head of the saddle stem and in the two corresponding recesses of the cradle, located on either side of the groove, the cradle comprising a first notch in its front part and a second notch in its rear part, through which the two screws are introduced.

4. The saddle support according to claim 3 wherein the notch located in the front part of the cradle is defined by two lugs which project from the lower side of the cradle.

5. The saddle support according to claim 4, wherein the second tapped hole having an inclined axis in the head opens into a further notch having a V-shaped profile cut at the junction point of the saddle stem and head, said further notch receiving the two aforesaid lugs projecting from the lower side of the cradle are housed.

6. The saddle support according to claim 3 wherein the notches of the front and rear parts of the cradle both comprise, an enlarged lower part and an upper narrower part, connected by a flat surface on which the head of the corresponding screw bears.

* * * * *